(12) United States Patent
Rud

(10) Patent No.: US 9,207,129 B2
(45) Date of Patent: Dec. 8, 2015

(54) PROCESS VARIABLE TRANSMITTER WITH EMF DETECTION AND CORRECTION

(71) Applicant: Rosemount Inc., Chanhassen, MN (US)

(72) Inventor: Jason H. Rud, Mayer, MN (US)

(73) Assignee: Rosemount Inc., Chanhassen, MN (US)

( * ) Notice: Subject to any disclaimer, the term of this patent is extended or adjusted under 35 U.S.C. 154(b) by 602 days.

(21) Appl. No.: 13/629,127

(22) Filed: Sep. 27, 2012

(65) Prior Publication Data

US 2014/0088905 A1    Mar. 27, 2014

(51) Int. Cl.
*H03M 1/12* (2006.01)
*G01K 7/20* (2006.01)
*G01K 7/02* (2006.01)

(52) U.S. Cl.
CPC . *G01K 7/20* (2013.01); *G01K 7/021* (2013.01)

(58) Field of Classification Search
CPC ....... H03M 1/18; H03M 1/20; H03M 1/1235; H03M 1/181; G10D 3/032; G10D 3/0365; G01F 1/58; G01F 19/00; H04L 25/08; H04L 25/06; H04L 25/068; H04L 7/0091; G01K 7/20; G01K 7/021
USPC ........ 341/131–155; 702/99, 133, 189, 85, 88, 702/183; 375/295, 296; 327/553, 555
See application file for complete search history.

(56) References Cited

U.S. PATENT DOCUMENTS

| | | | |
|---|---|---|---|
| 3,096,434 A | 7/1963 | King | |
| 3,404,264 A | 10/1968 | Kugler | |
| 3,468,164 A | 9/1969 | Sutherland | |
| 3,590,370 A | 6/1971 | Fleischer | |
| 3,688,190 A | 8/1972 | Blum | |
| 3,691,842 A | 9/1972 | Akeley | |
| 3,701,280 A | 10/1972 | Stroman | |
| 3,872,389 A | 3/1975 | Willard | |
| 3,973,184 A | 8/1976 | Raber | |
| RE29,383 E | 9/1977 | Gallatin et al. | |
| 4,058,975 A | 11/1977 | Gilbert et al. | |
| 4,099,413 A | 7/1978 | Ohte et al. | |
| 4,102,199 A | 7/1978 | Tsipouras | |
| 4,122,719 A | 10/1978 | Carlson et al. | |

(Continued)

FOREIGN PATENT DOCUMENTS

| | | |
|---|---|---|
| CN | 102269630 | 12/2011 |
| CN | 102272565 | 12/2011 |

(Continued)

OTHER PUBLICATIONS

"Statistical Process Control (Practice Guide Series Book)", Instrument Society of America, 1995, pp. 1-58 and 169-204.

(Continued)

*Primary Examiner* — Lam T Mai
(74) *Attorney, Agent, or Firm* — Westman, Champlin & Koehler, P.A.

(57) ABSTRACT

A preexisting voltage across a sensor is latched to a storage capacitor prior to any excitation current being applied to the sensor. Once the excitation current is applied, the voltage on the storage capacitor is directly subtracted from a differential voltage across the sensor. The subtraction is done before a measurement is converted to a digital value and passed to a transmitter. The subtraction is performed in hardware, and a time required to sample and hold the preexisting voltage across the storage capacitor is within a settling time used for collecting any sensor measurements.

22 Claims, 5 Drawing Sheets

(56) References Cited

U.S. PATENT DOCUMENTS

| | | |
|---|---|---|
| 4,250,490 A | 2/1981 | Dahlke |
| 4,279,151 A | 7/1981 | Anderson |
| 4,337,516 A | 6/1982 | Murphy et al. |
| 4,399,824 A | 8/1983 | Davidson |
| 4,475,823 A | 10/1984 | Stone |
| 4,517,468 A | 5/1985 | Kemper et al. |
| 4,530,234 A | 7/1985 | Cullick et al. |
| 4,549,180 A * | 10/1985 | Masuda ............... 340/870.04 |
| 4,565,456 A | 1/1986 | Iida et al. |
| 4,571,689 A | 2/1986 | Hildebrand et al. |
| 4,635,214 A | 1/1987 | Kasai et al. |
| 4,642,782 A | 2/1987 | Kemper et al. |
| 4,644,479 A | 2/1987 | Kemper et al. |
| 4,649,515 A | 3/1987 | Thompson et al. |
| 4,707,796 A | 11/1987 | Calabro et al. |
| 4,727,359 A | 2/1988 | Yuchi et al. |
| 4,736,367 A | 4/1988 | Wroblewski et al. |
| 4,770,543 A | 9/1988 | Burghoff et al. |
| 4,777,585 A | 10/1988 | Kokawa et al. |
| 4,783,659 A | 11/1988 | Frick |
| 4,831,564 A | 5/1989 | Suga |
| 4,841,286 A | 6/1989 | Kummer |
| 4,873,655 A | 10/1989 | Kondraske |
| 4,882,564 A | 11/1989 | Monroe et al. |
| 4,907,167 A | 3/1990 | Skeirik |
| 4,924,418 A | 5/1990 | Bachman et al. |
| 4,934,196 A | 6/1990 | Romano |
| 4,939,753 A | 7/1990 | Olson |
| 4,964,125 A | 10/1990 | Kim |
| 4,988,990 A | 1/1991 | Warrior |
| 4,992,965 A | 2/1991 | Holter et al. |
| 5,005,142 A | 4/1991 | Lipchak et al. |
| 5,043,862 A | 8/1991 | Takahashi et al. |
| 5,051,743 A | 9/1991 | Orszulak |
| 5,053,815 A | 10/1991 | Wendell |
| 5,067,099 A | 11/1991 | McCown et al. |
| 5,081,598 A | 1/1992 | Bellows et al. |
| 5,089,984 A | 2/1992 | Struger et al. |
| 5,098,197 A | 3/1992 | Shepard et al. |
| 5,099,436 A | 3/1992 | McCown et al. |
| 5,103,409 A | 4/1992 | Shimizu et al. |
| 5,111,531 A | 5/1992 | Grayson et al. |
| 5,121,467 A | 6/1992 | Skeirik |
| 5,122,794 A | 6/1992 | Warrior |
| 5,122,976 A | 6/1992 | Bellows et al. |
| 5,130,936 A | 7/1992 | Sheppard et al. |
| 5,134,574 A | 7/1992 | Beaverstock et al. |
| 5,137,370 A | 8/1992 | McCulloch et al. |
| 5,142,612 A | 8/1992 | Skeirik |
| 5,143,452 A | 9/1992 | Maxedon et al. |
| 5,148,378 A | 9/1992 | Shibayama et al. |
| 5,167,009 A | 11/1992 | Skeirik |
| 5,175,678 A | 12/1992 | Frerichs et al. |
| 5,193,143 A | 3/1993 | Kaemmerer et al. |
| 5,197,114 A | 3/1993 | Skeirik |
| 5,197,328 A | 3/1993 | Fitzgerald |
| 5,212,765 A | 5/1993 | Skeirik |
| 5,214,582 A | 5/1993 | Gray |
| 5,224,203 A | 6/1993 | Skeirik |
| 5,228,780 A | 7/1993 | Shepard et al. |
| 5,235,527 A | 8/1993 | Ogawa et al. |
| 5,265,031 A | 11/1993 | Malczewski |
| 5,265,222 A | 11/1993 | Nishiya et al. |
| 5,268,311 A | 12/1993 | Euen et al. |
| 5,274,572 A | 12/1993 | O'Neill et al. |
| 5,282,131 A | 1/1994 | Rudd et al. |
| 5,282,139 A | 1/1994 | Kobayashi |
| 5,282,261 A | 1/1994 | Skeirik |
| 5,293,585 A | 3/1994 | Morita |
| 5,294,890 A | 3/1994 | Hemminger et al. |
| 5,303,181 A | 4/1994 | Stockton |
| 5,305,230 A | 4/1994 | Matsumoto et al. |
| 5,311,421 A | 5/1994 | Nomura et al. |
| 5,317,520 A | 5/1994 | Castle |
| 5,319,576 A | 6/1994 | Iannadrea |
| 5,327,357 A | 7/1994 | Feinstein et al. |
| 5,333,240 A | 7/1994 | Matsumoto et al. |
| 5,347,843 A | 9/1994 | Orr et al. |
| 5,349,541 A | 9/1994 | Alexandro, Jr. et al. |
| 5,350,237 A | 9/1994 | Hida |
| 5,357,449 A | 10/1994 | Oh |
| 5,361,628 A | 11/1994 | Marko et al. |
| 5,365,423 A | 11/1994 | Chand |
| 5,367,612 A | 11/1994 | Bozich et al. |
| 5,384,699 A | 1/1995 | Levy et al. |
| 5,386,373 A | 1/1995 | Keeler et al. |
| 5,394,341 A | 2/1995 | Kepner |
| 5,394,543 A | 2/1995 | Hill et al. |
| 5,404,064 A | 4/1995 | Mermelstein et al. |
| 5,408,406 A | 4/1995 | Mathur et al. |
| 5,414,645 A | 5/1995 | Hirano |
| 5,419,197 A | 5/1995 | Ogi et al. |
| 5,430,642 A | 7/1995 | Nakajima et al. |
| 5,440,478 A | 8/1995 | Fisher et al. |
| 5,442,639 A | 8/1995 | Crowder et al. |
| 5,467,355 A | 11/1995 | Umeda et al. |
| 5,469,070 A | 11/1995 | Koluvek |
| 5,469,156 A | 11/1995 | Kogure |
| 5,469,735 A | 11/1995 | Watanabe |
| 5,473,629 A | 12/1995 | Muramoto |
| 5,481,199 A | 1/1996 | Anderson et al. |
| 5,483,387 A | 1/1996 | Bauhahn et al. |
| 5,485,753 A | 1/1996 | Burns et al. |
| 5,486,996 A | 1/1996 | Samad et al. |
| 5,488,697 A | 1/1996 | Kaemmerer et al. |
| 5,489,831 A | 2/1996 | Harris |
| 5,495,769 A | 3/1996 | Broden et al. |
| 5,510,779 A | 4/1996 | Maltby et al. |
| 5,511,004 A | 4/1996 | Dubost et al. |
| 5,519,647 A | 5/1996 | DeVille |
| 5,548,528 A | 8/1996 | Keeler et al. |
| 5,561,599 A | 10/1996 | Lu |
| 5,563,587 A | 10/1996 | Harjani |
| 5,570,300 A | 10/1996 | Henry et al. |
| 5,572,420 A | 11/1996 | Lu |
| 5,573,032 A | 11/1996 | Lenz et al. |
| 5,598,521 A | 1/1997 | Kilgore et al. |
| 5,600,148 A | 2/1997 | Cole et al. |
| 5,608,845 A | 3/1997 | Ohtsuka et al. |
| 5,623,605 A | 4/1997 | Keshav et al. |
| 5,637,802 A | 6/1997 | Frick et al. |
| 5,640,491 A | 6/1997 | Bhat et al. |
| 5,661,668 A | 8/1997 | Yemini et al. |
| 5,665,899 A | 9/1997 | Willcox |
| 5,669,713 A | 9/1997 | Schwartz et al. |
| 5,671,335 A | 9/1997 | Davis et al. |
| 5,675,504 A | 10/1997 | Serodes et al. |
| 5,675,724 A | 10/1997 | Beal et al. |
| 5,680,109 A | 10/1997 | Lowe et al. |
| 5,700,090 A | 12/1997 | Eryurek |
| 5,703,575 A | 12/1997 | Kirkpatrick |
| 5,704,011 A | 12/1997 | Hansen et al. |
| 5,705,978 A | 1/1998 | Frick et al. |
| 5,708,585 A | 1/1998 | Kushion |
| 5,713,668 A | 2/1998 | Lunghofer et al. |
| 5,719,378 A | 2/1998 | Jackson, Jr. et al. |
| 5,741,074 A | 4/1998 | Wang et al. |
| 5,742,845 A | 4/1998 | Wagner |
| 5,746,511 A | 5/1998 | Eryurek et al. |
| 5,752,008 A | 5/1998 | Bowling |
| 5,764,891 A | 6/1998 | Warrior |
| 5,781,119 A * | 7/1998 | Yamashita et al. ............ 340/903 |
| 5,781,878 A | 7/1998 | Mizoguchi et al. |
| 5,801,689 A | 9/1998 | Huntsman |
| 5,805,442 A | 9/1998 | Crater et al. |
| 5,828,567 A | 10/1998 | Eryurek et al. |
| 5,828,876 A | 10/1998 | Fish et al. |
| 5,848,383 A | 12/1998 | Yunus |
| 5,859,964 A | 1/1999 | Wang et al. |
| 5,876,122 A | 3/1999 | Eryurek |
| 5,887,978 A | 3/1999 | Lunghofer et al. |
| 5,923,557 A | 7/1999 | Eidson |
| 5,924,086 A | 7/1999 | Mathur et al. |
| 5,926,778 A | 7/1999 | Poppel |

(56) References Cited

U.S. PATENT DOCUMENTS

| | | | |
|---|---|---|---|
| 5,940,290 | A | 8/1999 | Dixon |
| 5,956,663 | A | 9/1999 | Eryurek |
| 5,970,430 | A | 10/1999 | Burns et al. |
| 6,016,706 | A | 1/2000 | Yamamoto et al. |
| 6,017,143 | A | 1/2000 | Eryurek et al. |
| 6,045,260 | A | 4/2000 | Schwartz et al. |
| 6,047,220 | A | 4/2000 | Eryurek |
| 6,047,222 | A | 4/2000 | Burns et al. |
| 6,119,047 | A | 9/2000 | Eryurek et al. |
| 6,192,281 | B1 | 2/2001 | Brown et al. |
| 6,195,591 | B1 | 2/2001 | Nixon et al. |
| 6,199,018 | B1 | 3/2001 | Quist et al. |
| 6,356,191 | B1 | 3/2002 | Kirkpatrick et al. |
| 6,594,613 | B1* | 7/2003 | Ley et al. .................. 702/140 |
| 7,003,417 | B2* | 2/2006 | Koukol et al. ................ 702/88 |
| 7,318,227 | B1 | 1/2008 | Hohne et al. |
| 8,378,872 | B2* | 2/2013 | Rud et al. .................. 341/155 |
| 2005/0021608 | A1 | 1/2005 | Wolff |
| 2006/0100807 | A1* | 5/2006 | Koukol et al. ................ 702/88 |
| 2014/0277606 | A1* | 9/2014 | Allstrom et al. .............. 700/52 |
| 2015/0003560 | A1* | 1/2015 | Flanagan et al. ............. 375/296 |

FOREIGN PATENT DOCUMENTS

| | | |
|---|---|---|
| DE | 3540204 C1 | 9/1986 |
| DE | 4008560 A1 | 9/1990 |
| DE | 4343747 A1 | 6/1994 |
| DE | 4433593 A1 | 6/1995 |
| DE | 19502499 A1 | 8/1996 |
| DE | 29600609 U1 | 2/1997 |
| DE | 19704694 A1 | 8/1997 |
| DE | 29917651 U1 | 11/2000 |
| DE | 19930660 A1 | 1/2001 |
| EP | 0122622 A1 | 10/1984 |
| EP | 0413814 A1 | 2/1991 |
| EP | 0487419 A2 | 5/1992 |
| EP | 0594227 A1 | 4/1994 |
| EP | 0624847 A1 | 11/1994 |
| EP | 0644470 A2 | 3/1995 |
| EP | 0807804 A2 | 11/1997 |
| EP | 0825506 A2 | 2/1998 |
| EP | 0827096 A2 | 3/1998 |
| EP | 0838768 A2 | 4/1998 |
| EP | 1058093 A1 | 12/2000 |
| FR | 2302514 A1 | 9/1976 |
| FR | 2334827 A1 | 7/1977 |
| GB | 928704 A | 6/1963 |
| GB | 1534280 A | 11/1978 |
| GB | 2310346 A | 8/1997 |
| JP | 58129316 A | 8/1983 |
| JP | 59116811 A | 7/1984 |
| JP | 59211196 A | 11/1984 |
| JP | 59211896 A | 11/1984 |
| JP | 60000507 A | 1/1985 |
| JP | 60076619 A | 5/1985 |
| JP | 60131495 A | 7/1985 |
| JP | 62030915 A | 2/1987 |
| JP | 64001914 A | 1/1989 |
| JP | 2005105 A | 1/1990 |
| JP | 5122768 A | 5/1993 |
| JP | 6242192 A | 9/1994 |
| JP | 7063586 A | 3/1995 |
| JP | 7234988 A | 9/1995 |
| JP | 8054923 A | 2/1996 |
| JP | 8136386 A | 5/1996 |
| JP | 8166309 A | 6/1996 |
| JP | 8247076 A | 9/1996 |
| JP | 10232170 A | 9/1998 |
| WO | 9425933 A1 | 11/1994 |
| WO | 9611389 A1 | 4/1996 |
| WO | 9612993 A1 | 5/1996 |
| WO | 9639617 A1 | 12/1996 |
| WO | 9721157 A1 | 6/1997 |
| WO | 9725603 A1 | 7/1997 |
| WO | 9806024 A1 | 2/1998 |
| WO | 9813677 A1 | 4/1998 |
| WO | 9820469 A1 | 5/1998 |
| WO | 0070531 A2 | 11/2000 |

OTHER PUBLICATIONS

"Time-Frequency Analysis of Transient Pressure Signals for a Mechanical Heart Valve Cavitation Study," ASAIO Journa, by Alex A. Yu et al., vol. 44, No. 5, pp. M475-479, (Sep.-Oct. 1998).

"Cavitation in Pumps, Pipes and Valve," Process Engineering, by Dr. Ronald Young, pp. 47 and 49 (Jan. 1990).

"Quantification of Heart Valve Cavitation Based on High Fidelity Pressure Measurements," Advances in Bioengineering 1994, by Laura A. Garrison et al., BED-vol. 28, pp. 297-298 (Nov. 6-11, 1994).

"Monitoring and Diagnosis of Cavitation in Pumps and Valves Using the Wigner Distribution," Hydroaccoustic Facilities, Instrumentation, and Experimental Techniques, NCA-vol. 10, pp. 31-36 (1991).

"Developing Predictive Models for Cavitation Erosion," Codes and Standards in a Global Environment, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

Web Pages from www.triant.com (3 pages), Apr. 2001.

Parallel, Fault-Tolerant Control and Diagnostics System for Feedwater Regulation in PWRS, by E. Eryurek et al., Proceedings of the American Power Conference, Apr. 2001.

"Programmable Hardware Architectures for Sensor Validation", by M. P. Henry et al., Control Eng. Practice, vol. 4, No. 10., pp. 1339-1354, (1996).

"Sensor Validation for Power Plants Using Adaptive Backpropagation Neural Network," IEEE Transactions on Nuclear Science, vol. 37, No. 2, by E. Eryurek et al. Apr. 1990, pp. 1040-1047.

"Signal Processing, Data Handling and Communications: The Case for Measurement Validation", by M. P. Henry, Department of Engineering Science, Oxfrd University, Apr. 2001.

"Smart Temperature Measurement in the '90", by T. Kerlin et al., C&I, (1990).

"Software-Based Fault-Tolerant Control Design for Improved Power Plant Operation," IEEE/IFAC Joint Symposium on Computer-Aided Control System Design, Mar. 7-9, 1994 pp. 585-590.

A Standard Interface for Self-Validating Sensors, by M. P. Henry et al., Report No. QUEL 1884/1891, (1991).

"Taking Full Advantage of Smart Transmitter Technology Now," by G. Orrison, Control Engineering, vol. 42, No. 1, Jan. 1995.

"Using Artifical Neural Networks to Identify Nuclear Power Power Plant States," by Israel E. Alguindigue et al., pp. 1-4, Apr. 2001.

"Application of Neural Computing Paradigms for Signal Validation," by B. R. Upadhyaya et al., Department Nuclear Engineering, pp. 1-18, Apr. 2001.

"Application of Neural Networks for Sensor Validation and Plant Monitoring," by B. Upadhyaya et al., Nuclear Technology, vol. 97, No. 2, Feb. 1992 pp. 170-176.

"Automated Generation of Nonlinear System Charaterization for Sensor Failure Detection," by B. R. Upadhyaya et al., ISA, 1989 pp. 269-274.

"In Situ Calibration of Nuclear Plant Platinum Resistance Thermometers Using Johnson Noise Methods," EPRI, Jun. 1983.

"Johnson Noise Thermometer for High Radiation and High-Temperature Environments," by L. Oakes et al., Fifth Symposium on Space Nuclear Power Systems, Jan. 1988, pp. 2-23.

"Development of a Resistance Thermometer for Use Up to 1600. degree, C.", by M. J, de Groot et al., CAL LAB, Jul./ Aug. 1996, pp. 38-41.

"Survey Applications, and Prospects of Johnson Noise Thermometry," by T. Blalock et al., Electrical Engineering Department, 1981 pp. 2-11.

"Noise Thermometry for Industrial and Metrological Applications at KFA Julich," by H. Brixy et al., 7th International Symposium on Temperature, 1992.

(56) References Cited

OTHER PUBLICATIONS

"Johnson Noise Power Thermometer and its Application in Process Temperature Measurement," T. V. Blalock et al., American Institute of Physics 1982, pp. 1249-1259.
"Field-based Architecture is Based on Open Systems, Improves Plant Performance", by P. Cleaveland, I&CS, Aug. 1996, pp. 73-74.
"Tuned-Circuit Dual-Mode Johnson Noise Thermometry ," by R. L. Shepard et al., Apr. 1992.
"Tuned-Circuits Johnson Noise Thermometry," by Micahel Roberts et al., 7.sup.th Symposium on Space Nuclear Power Systems, Jan. 1990.
"Smart Field Devices Provide New Process Dara, Increase System Flexibility," by Mark Boland, I&CS, Nov. 1994, pp. 45-51.
"Wavelet Analysis of Vibration, Part I: Theory.sup.1," by D. E. Newland, Journal of Vibration and Acoustics, vol. 116, Oct. 1994, pp. 409-416.
"Wavelet Analysis of Vibration, Part 2: Wavelet Maps," by D. E. Newland, Journal of Vibration and Acoustics, vol. 116, Oct. 1994, pp. 417-425.
"Development of Long-Life, High Reliability Remotely Operated Johnson Noise Thermometer," R. L. Shepard et al., ISA, 1991, pp. 77-84.
"Application of Johnson Noise Thermometry to Space Nuclear Reactors," by M. J. Roberts et al., Presented at the 6th Symposium on Space Nuclear Power Systems, Jan. 9-12, 1989.
"A Decade of Progress in High Temperature Jonson Noise Thermometry," by T. V. Blalock et al., American Institute of Physics, 1982 pp. 1219-1223.
"Sensor and Device Diagnostics for Predictive and Proactive Maintenance", by B. Boynton, A Paper Presented at the Electric Power Research Institute -Fossil Plant Maintainence Conferencein Baltimore, Maryland, Jul. 29-Aug. 1, 1996, pp. 50-1-50-6.
"Detection of Hot Spots in Thin Metal Films Using an Ultra Sensitive Dual Channel Noise Measurement System," by G. H. Massiha et al., Energy and Information Technologies in the Southeast, vol. 3 of 3, Apr. 1989, pp. 1310-1314.
"Detecting Blockage in Process Connections of Differential Pressure Transmitter", by E. Taya et al., SICE, 1995, pp. 1605-1608.
"Development and Application of Neural Network Algorithms for Process Diagnostics," by B. R. Upadyaya et al., Proceedings of the 29th Conference on Decision and Control, 1990 pp. 3277-3282.
"Fault-Tolerant Interface for Self-Validating Sensors", by M. P. Henry, Colloguim, pp. 3/1-3/2 (Nov. 1990).
"Fuzzy Logic and Artifical Neural Networks for Nuclear Power Plant Applications," by R. C. Berkan et al., Proceedings of the American Power Conference. Apr. 2001.
"Fuzzy Logic and Neural Network Applications to Fault Diagnosis ", by P. Frank et al. International Journal of Approximate Reasoning, (1997), pp. 68-88.
"Keynote Paper: Hardware Compilation—A New Technique for Rapid Prototyping of Digital Systems—Applied to Sensor Validation", by M. P. Henry, Control Eng. Practice, vol. 3, No. 7., pp. 907-924, (1995).
"The Implications of Digital Communications on Sensor Validation", ny M. Henry et al., Report No. QUEL 1912/92, (1992).
"In-Situ Response Time Testing of Thermocouples", ISA, by H. M. Hashemian et al., Paper No. 89/0056, pp. 587-593, (1989).
"An Integrated Architecture for Signal Validation in Power Plants," by B. R. Upadhyaya et al., Third IEEE International Symposium on Intelligent Control, Aug. 24-26, 1988, pp. 1-6.
"Measurement of the Temperature Fluctation in a Resistor Generating 1/F Fluctation," by S. Hashiguchi, Japanese Journal of Applied Physics, vol. 22, No. 5, Part 2, May 1983, pp. L284-L286.
"Check of Semiconductor Thermal Resistance Elements by the Method of Noise Thermometry", by A. B. Kisilevskii et al., Measurement Techniques, vol. 25, No. 3, Mar. 1982, New York, USA, pp. 244-246.
"Neural Networks for Sensor Validation and Plant Monitoring," by B. Upadhyaya, International Fast Reactor Safety Meeting, Aug. 12-16, 1990, pp. 2-10.

"Neural Networks for Sensor Validation and Plantwide Monitoring," by E. Eryurek, 1992.
"A New Method of Johnson Noise Thermometry", by C. J. Borkowski et al., Rev, Sci. Instrum., vol. 45, No. 2, (Feb. 1974) pp. 151-162.
"Thermocouple Continually Checker," IBM Technical Disclosure Bulletin, vol. 20, No. 5 pages 1954 (Oct. 1977).
"A Self-Validating Thermocouple," Janice C-Y et al., IEEE Transactions on Control Systems Technology, vol. 5, No. 2, pp. 239-253 (Mar. 1997).
"emWare's Releases EMIT 3.0, Allowed Manufactures to Internet and Network Enable Devices Royalty Free," 3 pages, PR Newswire (Nov. 4, 1998).
Warrior, J., "The IEEE P1451.1 Object Model Network Independent Interfaces for Sensors and Actuators," pp. 1-14, rosemount Inc. (1997).
Warrior, J., "The Collision Between the Web and Plant Floor Automation," 6th. WWW Conference Workshop on Embedded Web Technology, Santa Clara, CA (Apr. 7, 1997).
Microsoft Press Computer Dictionary, 3rd Edition, p. 124, Apr. 2001.
"Internal Statistical Quality Control for Quality Monitoring Instruments", by P. Girlinget al., ISA, 15 pp., 1999.. Web Pages from www.triant.com (3 pages), Apr. 2001.
Instrument Engineers' Handbook, Chapter IV entitled "Temperature Measurements", by T.J. Claggett, pp. 266-333, Jan. 1982.
"Improving Dynamic Performance of Temperature Sensors With Fuzzy Control Techniques," by Wang Lei et al., pp. 872-873 (1992).
"Microsoft Press Computer Dictionary" 2nd Edition, 1994, Microsoft Press. p. 156.
"A Microcomputer-Based Instrument for Applications for Applications in Platinum Resistance Thermomty," by H. Rosemary Taylor and Hector A. Navarro, Journal of Physics E. Scientific Instrument, vol. 16, No. 11, pp. 1100-1104 (1983).
"Experience in Using Estelle for the Specification and Verification of a Fieldbus Protocol: FIP," by Barrette et al., Computer Networking, pp. 295-304 (1990).
"Computer Simualtion of H1 Field Bus Transmission," by Utsumi et al., Advances in Instrumentation and Control, vol. 46, Part 2, pp. 1815-1827 (1991).
"Progress in Fieldbus Developments for Measuring and Control Application," by A. Schwaier, Sensor and Acuators, pp. 115-119 (1991).
"Ein Emulationsystem zur Leistungsanalyse von Feldbussystemen, Teil 1," by R. Hoyer, pp. 335-336 (1991).
"Simulatore Integrate: Controllo su bus di campo," by Barbino et al., Automazione e Strumentatzione, pp. 85-91 (Oct. 1993).
"Ein Modulares, verteiltes Diagnose-Expertensystem fur die Fehlerdiagnose in lokalen Netzen," by Jurgen M. Schroder, pp. 557-565 (1990).
"Fault Diagnosis of Fieldbus Systems," by Jurgen Quade, pp. 577-581 (Oct. 1992).
"Ziele and Anwendungen von Feldbussystemen," by T. Pfeifer et al. pp. 549-557 (Oct. 1987).
"PROFIBUS-Infrastrukturmassnahmen," by Tito Pfeifer et al., pp. 416-419 (Aug. 1991).
"Simulation des Zeitverhaltens von Feldbussystemen," by O. Schnelle, pp. 440-442 (1991).
"Modelisation et al simulation d'un bus de terrain: FIP," by Song et al., pp. 5-9 May 2001.
"Feldbusnetz fur Automatisierungssysteme mit intelligenton Funktionseinheiten," by W. Kriesel et al., pp. 486-489 (1987).
"Bus de campo para la inteconexion del proceso con sistemas digitales de control," Technologia, pp. 141-147 (1990).
"Dezentrale Installation mit Echtzeit-Feldbus," Netwerke, Jg. Nr.3 v. 14.3. 4 pages (1990).
"Process Measurement and Analysis," by Liptak et al., Instrument Engineers' Handbook, Third Edition, pp. 528-530, (1995).
"A TCP/IP Tutorial" by, Socolofsky et al. Spider Systems Limited, Jan. 1991 pp. 1-23.
"Approval Standards for Exposionproof Electrical Equipment General Requirements",Factory Mutual Research, CI. No. 3615, Mar. 1989, pp. 1-34.

(56) References Cited

OTHER PUBLICATIONS

"Approval Standards Intrinsically Safe Aparratus and Associated Apparatus for Use in Class I, II, and III, Division 1 Hazardous (Classified) Locations",Factory Mutual Research, CI. No. 3610, Oct. 1988, pp. 1-70.

"Automation On-Line" by, Phillips et al., Plant Services, Jul. 1997, pp. 41-45.

"Climb to New Heights by Controlling your PLCs Over the Internet" by Phillips et al., Intech, Aug. 1998, pp. 50-51.

"CompProcessor for Piezoresistive Sensors" MCA Technologies Inc. (MCA7707), pp. 1-8, Apr. 2001.

"Ethernet emerges as viable, inexpensive fieldbus", Paul G. Schreier, Personal Engineering, Dec. 1997, pp. 23-29.

"Ehthernet Rules Closed-loop System" by, Eidson et al., Intech, Jun. 1998, pp. 39-42.

"Fieldbus Standard for Use in Industrial Control Systems Part 2: Physical Layer Specification and Service Definition", ISA-S50-Feb. 1992, pp. 1-93.

"Fieldbus Standard for Use in Industrial Control Systems Part 3: Data Link Service Definition", ISA-S50-.Feb. 1997, Part 3 , Aug. 1997, pp. 1-159.

"Fieldbus Standard for Use in Industrial Control Systems Part 4: Data Link Service Definition", ISA-S50.Feb. 1997, Part 4, Aug. 1997, pp. 1-148.

"Fieldbus Support for Process Analysis" by, Blevins et al., Fisher-Rosemount Systems, Inc., 1995, pp. 1-23.

"Hypertext Transfer Protocol—HTTO/1.0" by Berners-Lee et al., MIT/LCS, May 1996, pp. 1-54.

"Infranets, Intranets, and the Internet" by, Pradip Madan, Echelon Corp, Sensors, Mar. 1997, pp. 46-50.

"Internets Technology Adoption into Automation" by, Fondl et al., Automation Business, pp. 1-5, Apr. 2001.

"Internet Protocol Darpa Internet Program Protocol Specification" by, Information Sciences Institute, University of Southern California, RFC 791, Sep. 1981, pp. 1-43.

"Introduction to Emit", emWare, Inc., 1997, pp. 1-22.

"Introduction to the Internet Protocols" by, Charles L. Hedrick, computer Scienc Facilities Group, Rutgers University, Oct. 3, 1988, pp. 1-97.

"Is There a Future for Ethernet in Industrial Control?", Micolot et al., Plant Engineering, Oct. 1988, pp. 44-46, 48, 50.

LFM/SIMA Internet Remote Diagnostics Research Project Summary Report, Stanford University, Jan. 23, 1997, pp. 1-6.

"Modular Microkernel Links GUI and Browser for Embedded Web Devices" by, Tom Williams,pp. 1-2, Apr. 2001.

"PC Software Gets Its Edge From Windows, Components, and the Internet", Wayne Lab, I&CS, Mar. 1997, pp. 23-32.

Proceedings Sensor Expo, Aneheim, California, Produced by Expocon Management Associates, Inc., Apr. 1996, pp. 9-21.

Proceedings Sensor Expo, Boston, Massachusetts, Produced by Expocon Management Associates, Inc. May 1997, pp. 1-416.

"Smart Sensor Network of the Furure" by, Jay Warrior, Sensors, Mar. 1997, pp. 40-45.

The Embedded Web Site by, John R. Hines, IEEE Spectrum, Sep. 1996, p. 23.

"Transmission Control Protocol: Darpa Internet Program Protocol Specification" Information Sciences Institute, Sep. 1981, pp. 1-78.

"On-Line Statistical Process Control for a Glass Tank Ingredient Scale," by R. A. Weisman, IFAC real Time Programming, 1985, pp. 29-38.

"The Performance of Control Charts for Monitoring Process Variation," C. Lowry et al., Commun. Statis. -Simula., 1995, pp. 40-437.

"A Knowlegde-Based Approach for Detection and Diagnosis of Out-Of-Control Events in Manufacturing Processes," by P. Love et al., IEEE, 1989, pp. 736-741.

"Advanced Engine Diagnostics Using Universal Process Modeling", by p. O'Sullivan, Presented at the 1996 SAE Conference on Future Transportation Technology, pp. 1-9, Apr. 2001.

International Search Report and Written Opinion from corresponding International Application No. PCT/US2013/060313, dated Jun. 3, 2014, 13 pages.

Office Action from European Patent Application No. 13773937.1, dated May 7, 2015.

Office Action from Chinese Patent Application No. 201210512993.1, dated Sep. 9, 2015.

\* cited by examiner

PROCESS VARIABLE TRANSMITTER WITH EMF DETECTION AND CORRECTION

BACKGROUND

The present invention relates to process variable transmitters used in process control and monitoring systems. More specifically, the present invention relates to monitoring EMF voltage across a sensor.

Process variable transmitters are used to measure process parameters in a process control or monitoring system. Microprocessor-based transmitters often include a sensor, an analog-to-digital (A/D) converter for converting an output from the sensor into a digital form, a microprocessor for compensating the digitized output, and an output circuit for transmitting the compensated output. Currently, this transmission is normally done over a process control loop, such as a 4-20 milliamp control loop, or wirelessly.

One exemplary parameter that is measured by such a system is temperature. Temperature is sensed by measuring the resistance of a restive temperature device (RTD), which is also sometimes called a platinum resistance thermometer (or PRT), or the voltage output from a thermocouple. Of course, these types of temperature sensors are only exemplary and others can be used as well. Similarly, temperature is only one exemplary process variable and a wide variety of other process control parameters can be measured as well, including, for example, pH, pressure, flow, etc. Therefore, while the present discussion proceeds with respect to a temperature sensor, it will be appreciated that the discussion could just as easily proceed with respect to sensing of other parameters.

There are a number of connection points between a temperature sensor and a measurement transmitter, that can fail or become degraded. When the connection points or measurement lines have elevated levels of resistance, small currents can be induced on these connection points or lines that impact the sensor measurement accuracy. The sensor connection points and measurement lines can become degraded, and thus exhibit these elevated levels of resistance, due to wire fraying, corrosion, or the connections can just become loose. In any of these cases, it is possible that small voltages across the temperature sensor or in the measurement loop can begin to form, and can be sensitive to temperature changes. These voltages can create measurement inaccuracies.

As one specific example, a resistive temperature detector (or RTD) ohmic measurement is generated by using up to six individual voltage points on a ratiometric calculation. All of these measurements take approximately 60 milliseconds to collect. In a typical equation for an RTD calculation, one term that can be important, and that feeds into the RTD calculation, provides significant levels of accuracy in the final output of the transmitter. This term is the residual voltage that preexists the measurement on the measurement lines, and is referred to as $V_{emf}$.

In order to obtain the value of $V_{emf}$, up to two 60 millisecond voltage measurements are taken per sensor, when no excitation current is induced across the RTD. These measurements represent thermal voltages that can be induced on the sensor wires due to fraying, corrosion, or loose connections, among other things. These measurements can be subtracted in software from the voltage drop measured across the RTD when the excitation current is present. U.S. Pat. No. 6,356,191 is directed to this process, and the process works quite well.

However, it takes time to collect the measurements for $V_{emf}$. For instance, in one conventional system, the time to collect the $V_{emf}$ measurements is approximately 120 milliseconds per sensor. This can negatively affect the update rate on a temperature transmitter.

SUMMARY

A differential voltage is used to measure a parameter of a sensor which is related to a process variable. Prior to measuring the differential voltage, a preexisting voltage across a sensor is latched to a storage capacitor. The latched voltage on the storage capacitor is subtracted from the differential voltage across the sensor. The subtraction is done before a measurement is converted to a digital value. This reduces inaccuracies in the measurement of the differential voltage.

DETAILED DESCRIPTION

Figure 1:
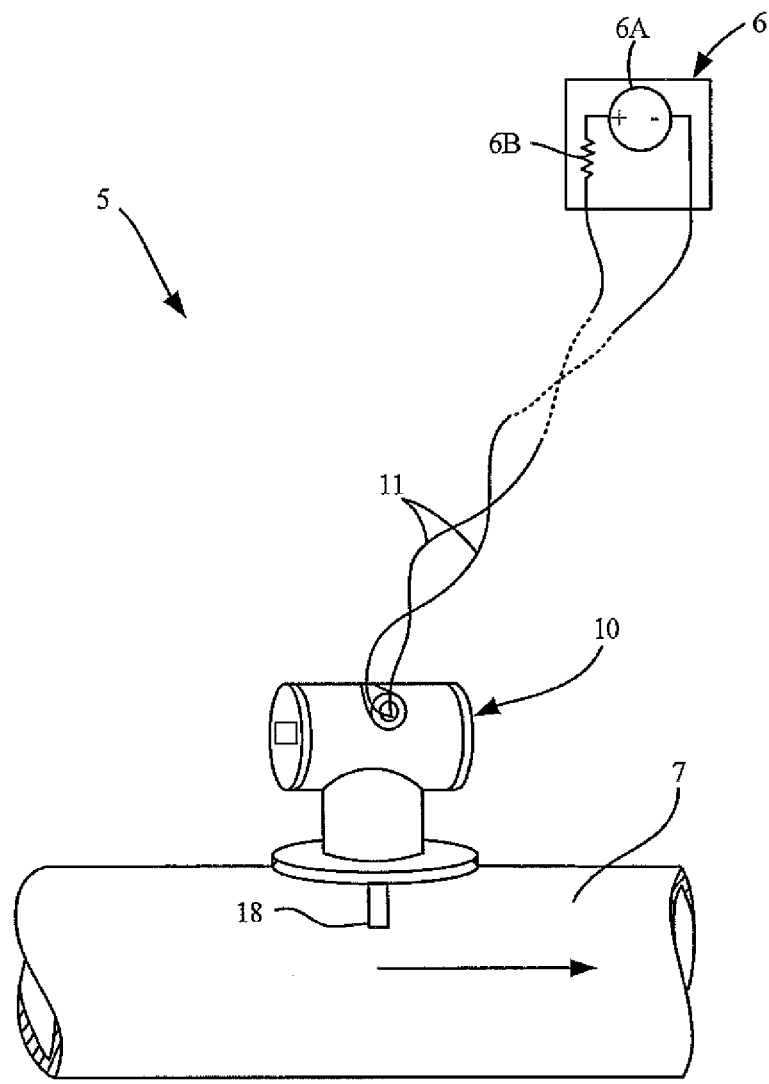
FIG. 1 is a simplified diagram showing an industrial process control system including a temperature sensor that senses a temperature of a process fluid.

FIG. 1 is a simplified diagram of an industrial process control system 5. In FIG. 1, process piping 7 carries a process fluid. A process variable transmitter 10 is configured to couple to the process piping 7. Transmitter 10 includes a process variable sensor 18 which, in one embodiment, comprises a resistive temperature device or other temperature sensor. However, this is exemplary only and sensor 18 could be any of a wide variety of other sensors, including a flow sensor, a pH sensor, a pressure sensor, etc.

Transmitter 10 transmits information to a remote location, such as a process control room 6. The transmission can be over a process control loop such as a two-wire control loop 11. The process control loop can be in accordance with any desired format, including, for example, a 4-20 milliamp process control loop, a process control loop which carries digital communications, a wireless process control loop, etc. In the example shown in FIG. 1, the process control loop 11 is powered by a power supply 6A at control room 6. This power is used to provide power to the process variable transmitter 10. Sense resistor 6B can be used to sense the current flowing through loop 11, although other mechanisms can be used as well.

Figure 2:
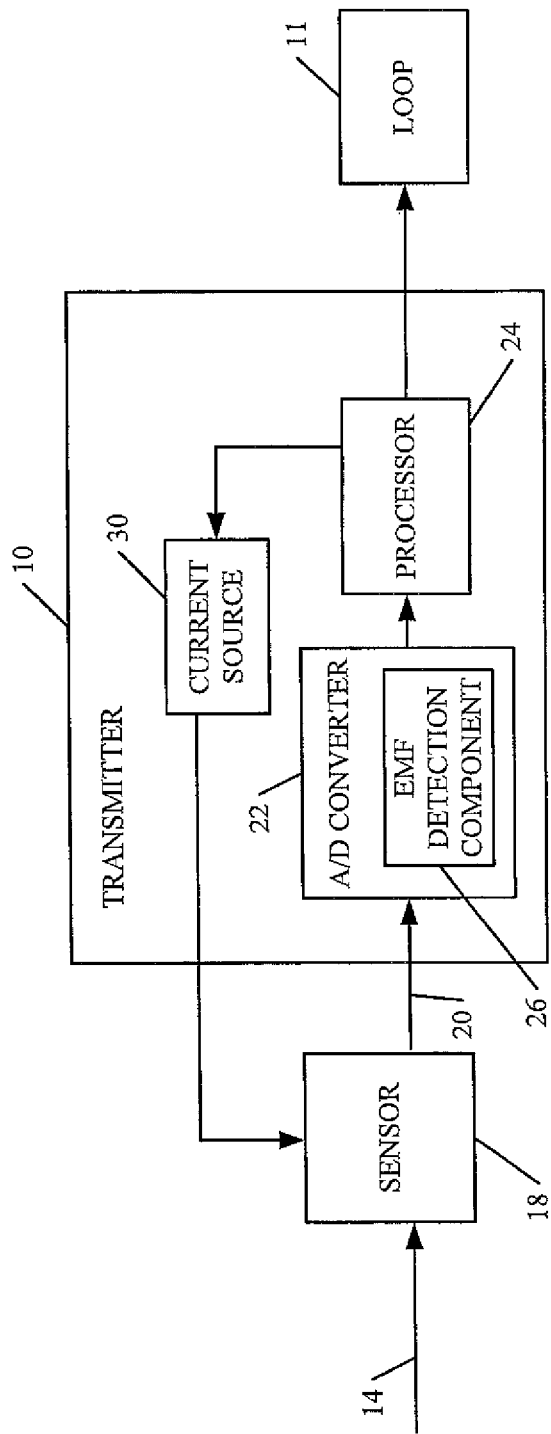
FIG. 2 is a block diagram illustrating the transmitter of FIG. 1 in more detail.

FIG. 2 is a block diagram of a portion of industrial process control system 5, shown in FIG. 1, and transmitter 10 is shown in greater detail. In FIG. 2, sensor 18 is illustratively a process variable transmitter that receives input 14 from a process being sensed. The input is illustratively the process fluid flowing through piping 7, and sensor 18 is illustratively a temperature sensor, such as a resistive temperature device. Sensor 18 illustratively provides an analog output 20, indicative of the sensed parameter (e.g., temperature), to A/D converter 22 in transmitter 10.

In one embodiment, it should be noted that the output 20 from sensor 18 can illustratively be provided to a circuit (not shown in FIG. 2) that amplifies and filters the analog signal, as appropriate. This can be part of sensor 18, or transmitter 10 or a separate circuit. In any case, the amplified and filtered signal 20 is then provided to A/D converter 22. A/D converter 22 provides a digitized output to processor 24, which is a digital representation of the analog signal 20 provided by sensor 18.

Processor 24 includes associated memory and clock circuitry and provides information regarding the sensed parameter over process control loop 11. It should be noted that processor 24 can include an input/output (I/O circuit), or an I/O circuit can be provided separately, that transmits information in a digital format on loop 11, or in an analog format by controlling current flow though loop 11. Thus, the information related to the sensed parameter is provided over process control loop 11 by transmitter 10. Processor 24 is shown in this embodiment as being separate from A/D converter 22. However, it could be included in A/D converter 22, or A/D converter 22 can have its own state machine or processor, separate from processor 24, controlling other parts of A/D converter 22 and controlling EMF compensation as discussed below. The present description is provided by way of example only.

FIG. 2 also shows that transmitter 10 includes current source 30 that is controlled by processor 24. Current source 30 can provide excitation current (also referred to as a control signal), as needed, to sensor 18. For instance, where sensor 18 is a resistive temperature device, current source 30 provides an excitation current across the resistive temperature device so that the voltage across the resistive temperature device can be used to provide the output 20 indicative of the sensed temperature of the fluid.

The embodiment shown in FIG. 2 also illustrates that A/D converter 22 includes EMF detection component 26. EMF detection component 26 detects an EMF voltage preexisting on the sensor 18 prior to application of the excitation current. Component 26 can be either internal or external to A/D converter 22. It is shown internal to A/D converter 22 in the example shown in FIG. 2, but this is by way of example only. EMF detection component 26 provides an output indicative of the level of the detected preexisting EMF voltage to processor 24, and it is also configured to subtract the preexisting EMF voltage from the voltage in signal 20 when the excitation current is applied, in order to correct signal 20 for the preexisting EMF voltage.

Figure 3A:
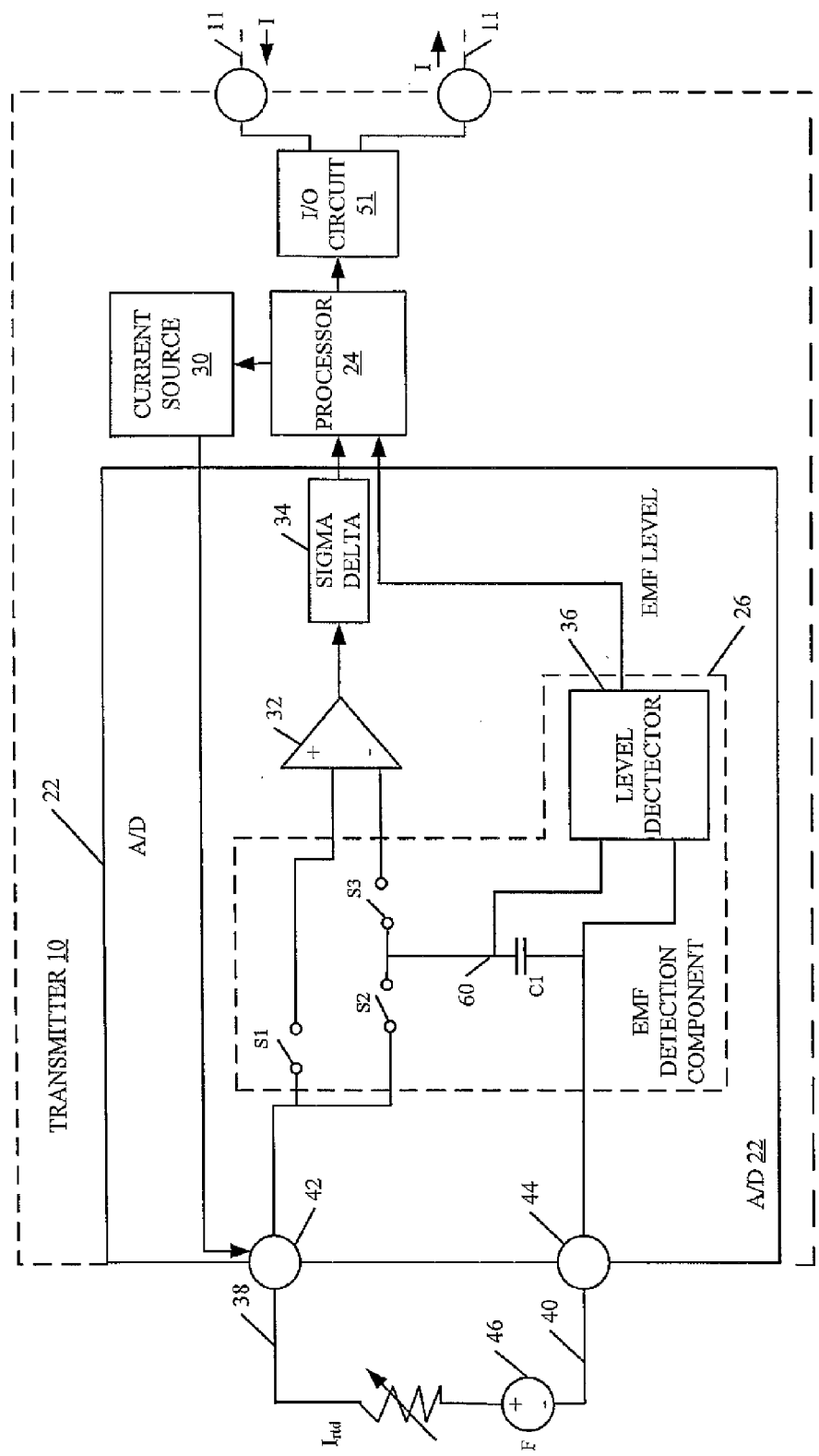
FIGS. 3A and 3B are exemplary schematic and partial block diagrams showing a transmitter with an EMF detection component in more detail.

FIG. 3A is a more detailed diagram of transmitter 10, and similar items are numbered the same as in FIG. 2. FIG. 3A also specifically shows more detail for A/D converter 22 and EMF detection component 26. In the embodiment shown in FIG. 3A, A/D converter 22 illustratively includes differential amplifier 32 and a sigma delta converter 34. Of course, sigma delta converter 34 is shown by way of example only and other conversion mechanisms can be used as well.

FIG. 3A also shows that EMF detection component 26 illustratively includes level detector 26, switches S1, S2 and S3, and capacitor C1. FIG. 3A shows that sensor 18 has two leads 38 and 40 which can be coupled to input terminals 42 and 44, respectively. In one embodiment, the voltage across terminals 42 and 44 is indicative of the temperature sensed by sensor 18, in addition to the EMF voltage represented by voltage source 46. Sensor 18 can illustratively be a four lead sensor with two additional leads coupled to two additional terminals, respectively. This is shown in greater detail with respect to FIG. 3B described below. However, for the sake of the present example, the description will proceed with respect to sensor 18 having two leads connected to terminals 42 and 44.

A more detailed operation of EMF detection component 26 is described below with respect to FIG. 4. Briefly, however, the voltage across terminals 42 and 44 is first latched across capacitor C1, before the excitation current $I_{rtd}$ is provided across sensor 18. This effectively causes storage capacitor C1 to store the preexisting voltage on sensor 18 (i.e., the EMF voltage 46). Then, switch S2 is opened and switches S1 and S3 are closed. Processor 24 controls current source 30 to apply excitation current $I_{rtd}$ across sensor 18 to develop a voltage across sensor 18 to take a temperature measurement. This circuit configuration operates to subtract the voltage on capacitor C1 from the voltage across terminals 42 and 44, before it is input to differential amplifier 32. That is, the voltage difference at the input to differential amplifier 32 between terminal 42 and circuit node 60 has the EMF voltage 46 effectively removed from it because it was previously stored on capacitor C1. At the same time, level detector 36 detects the voltage level across capacitor C1, which is indicative of EMF voltage 46. Level detector 36, in one embodiment, is a comparator that compares the EMF voltage to one or more thresholds that can be set empirically or otherwise. If the EMF voltage exceeds any of the thresholds, detector 36 outputs an indication of this to processor 24. Processor 24 can then determine whether the EMF voltage is excessive and requires further action.

Therefore, differential amplifier 32 provides an output to sigma delta converter 34 that is indicative of the voltage across sensor 18, but not EMF voltage 46, because that has been subtracted from the voltage across terminals 42 and 44. The output from level detector 36, and the output from converter 34, are provided to processor 24 for further processing.

Figure 4:
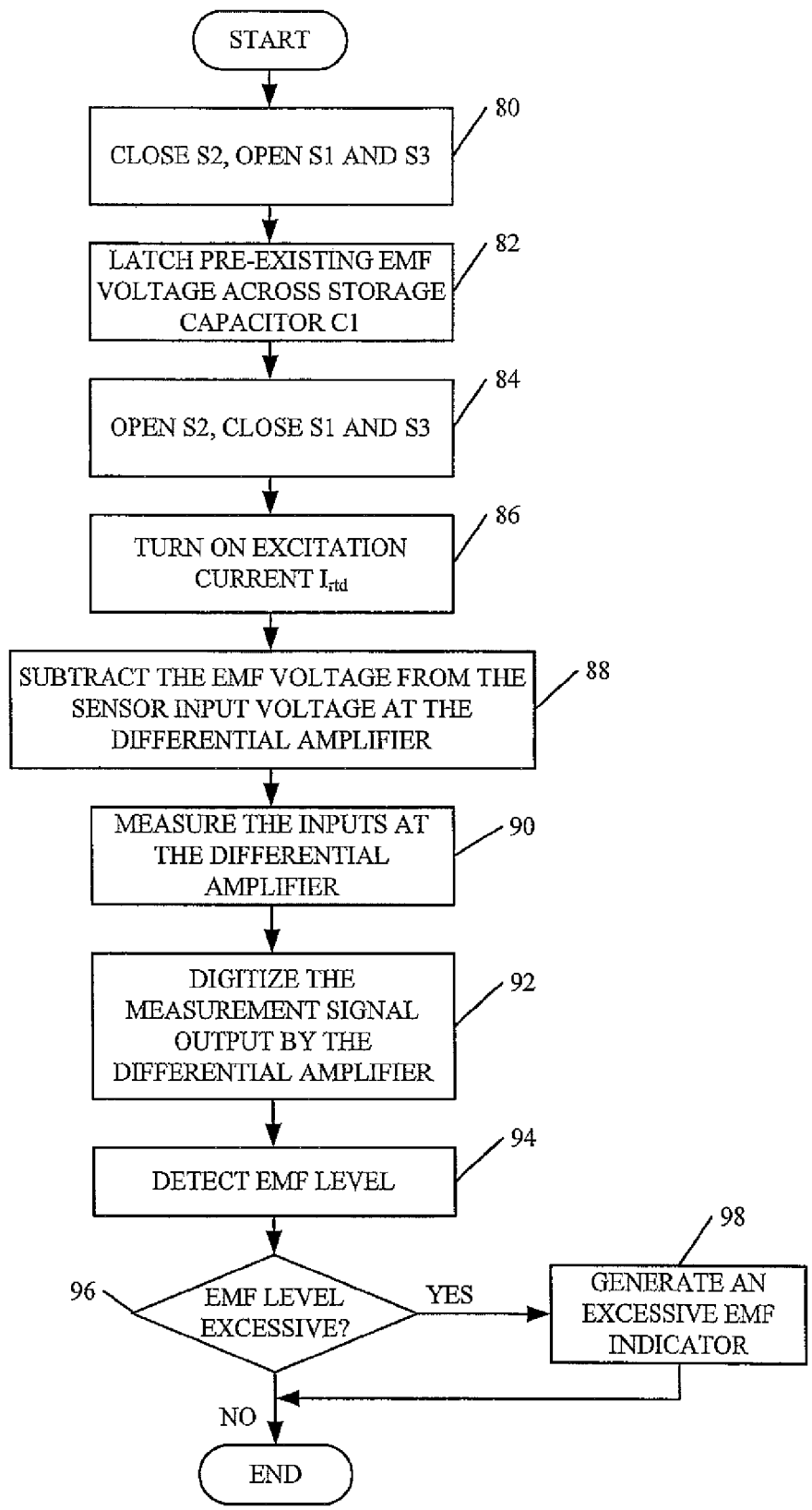
FIG. 4 is a flow diagram showing one example of the operation of the circuit shown in FIG. 3.

FIG. 4 illustrates the operation of transmitter 10 in more detail. The operation of transmitter 10 will now be described with respect to FIGS. 2, 3A and 4 in conjunction with one another.

Processor 24 first provides a control signal to close switch S2 and open switches S1 and S3. This is indicated by block 80 in FIG. 4, and it is done before processor 24 controls current source 30 to apply the excitation current $I_{rtd}$ across resistor 18. Therefore, this has the effect of latching the preexisting EMF voltage across storage capacitor C1. This is indicated by block 82 in FIG. 4.

Processor 24 then opens switch S2 and closes switches S1 and S3. This is indicated by block 84 in FIG. 4. Processor 24 then turns on current source 30 to apply excitation current $I_{rtd}$ across sensor 18. This is indicated by block 86 in FIG. 4.

Therefore, the voltage across sensor 18, along with the EMF voltage 46, is applied across terminals 42 and 44. Capacitor C1 acts to subtract the EMF voltage from that input voltage, so that the voltage applied to the inputs of differential amplifier 32 (across terminal 42 and node 60) is substantially only the voltage across sensor 18. Subtracting the EMF voltage from the sensor input voltage at the input of the differential amplifier 32 is indicated by block 88 in FIG. 4.

The differential amplifier 32 then provides an input to sigma delta converter 34 that is indicative of a measurement of the voltage across sensor 18. This is indicated by block 90 in FIG. 4.

Converter 34 then digitizes the measurement signal output by differential amplifier 32 and provides a digital representation of the sensor voltage to processor 24. This is indicated by block 92 in FIG. 4.

Level detector 36 detects the voltage level across capacitor C1, which is substantially equivalent to EMF voltage 46. As discussed above, this can be done by comparing the EMF voltage on capacitor C1 to one or more thresholds. Of course, it can be digitized as well. Detecting the EMF voltage level is indicated by block 94 in FIG. 4.

The EMF voltage level is provided to processor 24 so that processor 24 can determine whether the EMF voltage is high enough to indicate a warning condition, or other problem that the user should be made aware of. For instance, when the voltage level exceeds a predetermined threshold value, this can indicate undue wear or corrosion of leads 38 and 40, or it can indicate a loose connection at one of terminals 42 and 44, or it can indicate fraying or corrosion of wires used to connect sensor 18 to A/D converter 22, or any of a wide variety of other conditions. For instance, there may also be thermocouple junctions at connection points that add to the EMF voltage when exposed to thermal gradients. This will be captured in the EMF voltage 46 as well. The particular voltage threshold can be set empirically or otherwise, and more than one can be set as well. In one embodiment, it is set to approximately +/−12 mV, although any other desired voltage level can be used as well. Detecting whether the EMF voltage level is excessive is indicated by block 96 in FIG. 4.

If processor 24 determines that the EMF voltage level is excessive, it generates an excessive EMF indicator, that can be detectable by the user, so the user knows of the condition. This is indicated by block 98 in FIG. 4. In one embodiment, for instance, processor 24 simply sets a status bit to indicate that the EMF voltage is excessive, and that information is transmitted to control room 6 using loop 11. Of course, other types of indicators can be used as well.

Figure 3B:
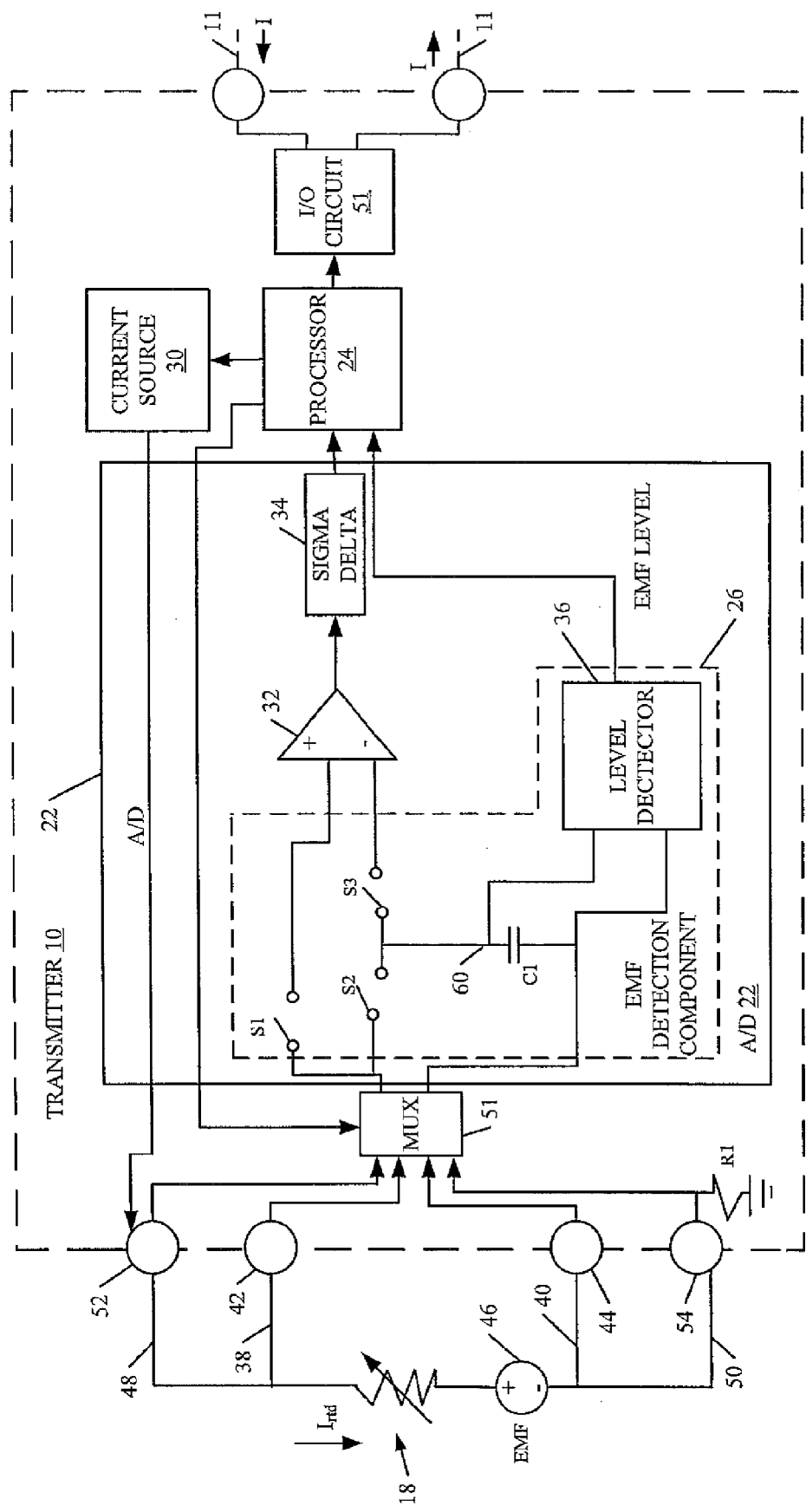

Again, it will be noted that while FIG. 3A shows that sensor 18 is only connected to terminals 42 and 44, this is exemplary only. FIG. 3B shows an embodiment in which sensor 18 is a four lead sensor with additional leads 48 and 50 coupled to terminals 52 and 54, respectively. The excitation current $I_{rtd}$ is applied from current source 30 at terminal 52 and lead 50 to sensor 18. Processor 24 controls multiplexor 53, which receives inputs from terminals 42, 44, 52 and 54 so the desired voltages are input to differential amplifier 32 and EMF detection component 26. The voltage drop in the connections to terminals 42 and 44 can largely be eliminated because substantially all of the excitation current $I_{rtd}$ flows between terminals 52 and 54 and across resistor R1. This improves accuracy. However, there still may be undesired preexisting voltage 46 in the circuit, and this can be detected and compensated for as set out above with respect to FIGS. 3A and 4.

In an embodiment where a thermocouple (or other voltage sensor) is used, there will be a voltage from the sensor, but resistance will also be present on the sensor loop due to the high resistivity of the wires and junctions connecting to the sensor. When this resistance changes, it can indicate some type of degrading condition such as those mentioned above in the other embodiment. In such an embodiment, the resistance on the sensor loop can be measured by applying an excitation current in the same way as the resistance of an RTD is sensed. The thermocouple (or other sensor) voltage is compensated for (like the preexisting EMF voltage 46 discussed above) to obtain a measure of the loop resistance. This can be done intermittently to monitor the loop resistance.

It can thus be seen that the present system automatically compensates for residual (preexisting) EMF voltage that exists on any of the measurement lines or terminals in the system. While it is described with respect to a resistive temperature device, it can be applied to thermocouples as well in order to measure their loop resistance. Of course, it can be applied to other sensors to sense other parameters and temperature is described by way of example only. It can also be seen that the compensation is done in hardware, very quickly, prior to digitizing the sensor measurement. Thus, it can be performed well within the normal settling time of a measurement circuit.

Although the present invention has been described with reference to preferred embodiments, workers skilled in the art will recognize that changes may be made in form and detail without departing from the spirit and scope of the invention.

What is claimed is:

1. A process variable transmitter, comprising:
    an analog-to-digital (A/D) converter that receives a sensor signal from a sensor indicative of a sensed process variable, the sensor being controllable to receive a control signal and output the sensor signal in response to the control signal, the A/D converter converting the sensor signal into a digital signal;
    a processor, that provides the control signal to the sensor and that receives the digital signal and provides a measurement output indicative of the digital signal; and
    a detection component receiving a preexisting input from the sensor, prior to the processor providing the control signal to the sensor, and providing a detection signal to the processor indicative of a level of the preexisting input.

2. The process variable transmitter of claim 1 wherein the sensor signal comprises a voltage indicative of the sensed process variable and wherein the detection component detects the preexisting input as a preexisting voltage in the preexisting input.

3. The process variable transmitter of claim 2 and further comprising:
    a current source controllably coupled to the processor to provide the control signal to the sensor as a control current.

4. The process variable transmitter of claim 3 wherein the sensor comprises a resistive temperature device and wherein the control current comprises an excitation current applied to the resistive temperature device to obtain a voltage indicative of a sensed temperature.

5. The process variable transmitter of claim 3 wherein the detection component stores the preexisting voltage and compensates the sensor signal for the preexisting voltage to obtain a compensated sensor signal.

6. The process variable transmitter of claim 5 wherein the detection component compensates for the preexisting voltage before the A/D converter receives the sensor signal so the sensor signal received by the A/D converter comprises the compensated sensor signal.

7. The process variable transmitter of claim 6 wherein the detection component compensates the sensor signal by subtracting the preexisting voltage from the sensor signal to obtain the compensated sensor signal.

8. The process variable transmitter of claim 7 wherein the subtracting is performed by hardware components.

9. The process variable transmitter of claim 8 wherein the detection component stores the preexisting voltage on a storage capacitor and wherein the storage capacitor is switched into an input to the A/D converter to subtract the preexisting voltage from the sensor signal at the input to the A/D converter.

10. The process variable transmitter of claim 7 wherein the A/D converter includes a differential amplifier coupled to an A/D conversion mechanism and wherein the detection component compensates the sensor signal at an input to the differential amplifier.

11. The process variable transmitter of claim 10 wherein the detection component provides the detection signal to the processor indicative of a level of the preexisting voltage, and wherein the processor provides an output indicative of the preexisting voltage being excessive when the preexisting voltage exceeds a predetermined threshold voltage.

12. The process variable transmitter of claim 11 wherein the processor provides the output over a control loop.

13. The process variable transmitter of claim 12 wherein the control loop comprises a 4-20 mA control loop.

14. The process variable transmitter of claim 1 wherein the A/D converter receives the sensor signal from a thermocouple.

15. The process variable transmitter of claim 1 wherein the processor is part of the A/D converter.

16. The process variable transmitter of claim 1 wherein the processor comprises a first processor that is separate from the A/D converter and a second processor that is part of A/D converter.

17. A method of sensing a process variable in a process control system, the method comprising:
- providing a control signal to a sensor to obtain, at a sensor input, a sensor signal from the sensor indicative of the process variable;
- converting the sensor signal from an analog signal to a digital signal;
- providing an output on a process control loop indicative of the digital signal;
- prior to providing the control signal, detecting a preexisting signal level at the sensor input; and
- after providing the control signal, compensating the sensor signal for the preexisting signal level before converting the sensor signal to the digital signal.

18. The method of claim 17 and further comprising:
- detecting whether the preexisting signal level exceeds a predetermined threshold level; and
- if so, providing the output on the process control loop to indicate that the preexisting signal level exceeds the predetermined threshold level.

19. The method of claim 18 wherein the sensor comprises a resistive device and wherein providing the control signal comprises:
- providing an excitation current to the resistive device.

20. The method of claim 19 wherein converting the sensor signal is performed by a measurement circuit, wherein the sensor signal comprises a sensor voltage, wherein the preexisting signal level comprises a preexisting voltage and wherein compensating comprises:
- storing the preexisting voltage on a capacitor prior to providing the excitation current; and
- switching the capacitor into the measurement circuit to subtract the preexisting voltage from the sensor voltage prior to converting the sensor voltage to the digital signal.

21. A process control system, comprising:
- a sensor that senses a process variable and provides an analog sensor signal indicative of the sensed process variable, the sensor being controllable to receive a control signal and output the analog sensor signal in response to the control signal;
- a process variable transmitter comprising:
  - an analog-to-digital (A/D) converter that receives, at a sensor input, the analog sensor signal from the sensor, the A/D converter converting the sensor signal into a digital signal;
  - a processor, coupled to the A/D converter, that provides the control signal to the sensor and that receives the digital signal and provides a measurement output indicative of the digital signal; and
  - a detection component detecting a preexisting signal level, at the sensor input, prior to the controller providing the control signal to the sensor, and providing a detection signal to the processor indicative of a level of the preexisting input, the detector compensating the analog sensor signal for the preexisting signal level after the processor provides the control signal to the sensor; and
- a control loop, the processor providing the measurement output on the control loop.

22. The process control system of claim 21 wherein the sensor comprises a temperature sensor and wherein the control signal comprises an excitation current for the temperature sensor.

* * * * *